(12) United States Patent
Achour et al.

(10) Patent No.: US 6,928,248 B2
(45) Date of Patent: Aug. 9, 2005

(54) OPTICAL COMMUNICATIONS SYSTEM WITH BACK-UP LINK

(75) Inventors: Maha Achour, San Diego, CA (US); Eric Korevaar, San Diego, CA (US)

(73) Assignee: Optical Access, Inc., San Diego, CA (US)

( * ) Notice: Subject to any disclaimer, the term of this patent is extended or adjusted under 35 U.S.C. 154(b) by 645 days.

(21) Appl. No.: 09/871,472

(22) Filed: May 30, 2001

(65) Prior Publication Data

US 2002/0181036 A1 Dec. 5, 2002

(51) Int. Cl.[7] .................... H04B 10/00; H04B 10/08
(52) U.S. Cl. .............................. 398/115; 398/22
(58) Field of Search .................... 398/27, 121, 2, 398/128, 129, 115

(56) References Cited

U.S. PATENT DOCUMENTS

| | | | |
|---|---|---|---|
| 3,794,841 A | 2/1974 | Cosentino | |
| 4,809,257 A | 2/1989 | Gantenbein | |
| 5,416,627 A | 5/1995 | Wilmoth | |
| 5,526,161 A | 6/1996 | Suzuki | |
| 5,777,768 A | 7/1998 | Korevaar | |
| 6,539,213 B1 * | 3/2003 | Richards et al. | 455/226.3 |
| 2002/0165002 A1 * | 11/2002 | Kolinko et al. | 455/500 |
| 2002/0176139 A1 * | 11/2002 | Slaughter et al. | 359/172 |
| 2002/0187769 A1 * | 12/2002 | Johnson et al. | 455/403 |

FOREIGN PATENT DOCUMENTS

EP  1 067 730  * 1/2001

* cited by examiner

*Primary Examiner*—M. R. Sedighian
*Assistant Examiner*—Shi K. Li
(74) *Attorney, Agent, or Firm*—Nydegger & Associates

(57) ABSTRACT

A device and method for operational switching between line-of-sight wireless communications transceivers requires evaluating a useful received signal strength intensity (RSSI) for a first transceiver, and switching to a second transceiver when the consequent bit error rate (BER) is not useful for the first transceiver. Subsequent switching between the first and second transceivers is accomplished in accordance with a timed sequence regimen that involves variable time delays, and considerations of RSSI changes within determined time periods. Preferably, the first transceiver transmits and receives on a laser beam and the second transceiver transmits and receives on a microwave beam.

19 Claims, 3 Drawing Sheets

OPTICAL COMMUNICATIONS SYSTEM WITH BACK-UP LINK

FIELD OF THE INVENTION

The present invention pertains to communications systems. More particularly, the present invention pertains to line-of-sight wireless communications systems. The present invention is particularly, but not exclusively, useful as a switching device for changing between an optical communications system and microwave communications system to achieve a maximum data throughput by optimizing the use of the optical communications system.

BACKGROUND OF THE INVENTION

The last mile in a communications network can present many problems that are quite unique, and are very much unlike those encountered by the more extensive cross-country links of the network. Specifically, significant portions of this last mile are typically in an urban environment wherein there are requirements that land-line links be regulated and routed in accordance with specified codes. An alternative to the complications confronted by land-line links within the last mile is to use line-of-sight wireless systems which can transmit data directly from one station to another through free space.

Presently it is known that there are two types of wireless systems which are particularly useful for establishing line-of-sight communications links through free space. These are: 1) an optical wireless system, and 2) a microwave system. Both, however, have their respective advantages and disadvantages. Specifically, an optical wireless communications system has a relatively high data transmission rate. In an order of magnitude, the data transmission rate on an optical wireless system is around ten times higher than the data transmission rate on a microwave system. On the other hand, a microwave system is typically more robust than an optical wireless system in that its effective operation is far less susceptible to interference from atmospheric conditions such as fog and precipitation. Further, in addition to the more obvious atmospheric conditions that can hamper the operation of an optical wireless communications system, the sun can also have an adverse effect on such an operation by increasing the noise level of the communications channel when it is receiving direct sunlight. Moreover, the effect of the sun may be asymmetric, and hamper the operation of one station in the line-of-sight communications link while other stations may remain unaffected.

A meaningful measure of the effectiveness of the data transmission rate of a laser communications system is its bit error rate (BER). As is well known, bits (abbrev. for BInary digiT) are single occurrences in a code, or language, which employs only two kinds of characters (e.g. 0 and 1). While not all bits are absolutely necessary for an effective communication, there is a limit to how far the data can be degraded. Stated differently, there is a BER above which there is no longer an effective communication. It happens that, for a laser communications system, the BER can be determined in several ways known in the pertinent art. One way is by measuring the received signal strength intensity (RSSI) of the laser beam, and then calculating the BER from the RSSI.

Absent a prolonged blockage of its beam path, such as might be caused by a window washer or some other barrier, it is possible to continue the operation of a line-of-sight communications system under most atmospheric conditions. To do this effectively, however, it is necessary for there to be a reliable device that will appropriately switch between an optical wireless system (higher data transmission rate) and a microwave system (more robust). Additionally, the switching device should be capable of ignoring brief interruptions in the communications beam, such as might be caused by the flight of a bird. At all times, however, it needs to favor communications on the optical wireless system because it has the higher data transmission rate. Nevertheless, in any event, the higher data transmission rate optical wireless system should be used only when it is capable of stabilized operation.

In light of the above it is an object of the present invention to provide a device and method for operationally switching between line-of-sight communications systems which will optimize use of the system having the higher data transmission rate. Another object of the present invention is to provide a device and method for operationally switching between line-of-sight communications systems which maintains an effectively uninterrupted communications link despite brief interruptions and degradations caused by atmospheric conditions. Still another object of the present invention is to provide a device and method for operationally switching between line-of-sight communications systems which will account for low signal-to-noise ratios such as might be caused by sunlight saturation. Yet another object of the present invention is to provide a device and method for operationally switching between line-of-sight communications systems which is easy to use, relatively simple to manufacture, and comparatively cost effective.

SUMMARY OF THE PREFERRED EMBODIMENTS

A device for operationally switching between line-of-sight wireless communications systems between stations includes, at each station, a laser beam transceiver, which is an example of a wireless transceiver, a microwave beam transceiver, and a switch for changing from one transceiver to the other. Specifically, the purpose here is to optimize the transmission of data over the systems from station to station by using the higher data transmission rate of the laser beam transceiver, whenever possible. To do this, it must first be determined whether the laser beam transceiver is operationally functional. If the laser beam transceiver (optical link) is not operationally functional, the more rugged, but slower, microwave beam transceiver (back-up link) is used as a back-up. In particular, the optical link could use lasers, light emitting diodes, or other light sources for the carrier, and the back-up microwave link could also be a millimeter wave link, a copper cable, or some other secondary communications link. More generally, the system could be used for switching between a primary line of sight communications link (which could be optical or millimeter wave) and a secondary communications link.

At all times during the operation of the present invention, the optical signal is monitored as it is received by the laser beam transceiver. Specifically, this is done to determine the received signal strength intensity (RSSI) of the optical signal. Using this RSSI, a bit error rate (BER) is calculated. The BER is then compared with a reference rate, above which the laser beam transceiver is not operationally functional. Generally, as intended for the present invention, whenever the BER is above the reference rate, the switch will change from the laser beam transceiver to the microwave beam transceiver. Further, the switch will stay with the microwave beam transceiver until the BER goes back below the reference rate. These changes, however, are accomplished in accordance with a variable timed sequence regimen, and with due consideration given to background noise.

The variable timed sequence regimen of the present invention relies on the concerted operation of a first delay circuit and a second delay circuit. Specifically, with the first delay circuit, the transmission and reception of the signal is continued using the laser beam transceiver for a time interval ($\Delta t$) immediately after the BER goes above the reference rate. If the BER, however, remains above the reference rate beyond the time interval ($\Delta t$), the switch changes to the microwave beam transceiver. The transmission and reception of the signal is then accomplished by the microwave beam transceiver as long as the BER remains above the reference rate. With the second delay circuit, the microwave transceiver continues in use until the BER on the laser transceiver goes back below the reference rate and stays below the reference rate for a time interval $\geq(\Delta\tau)$. This is done to ensure the laser system has stabilized before it is again put into use. In the event there is an instability (e.g. a situation wherein there are rapid changes of the BER back and forth across the reference rate), the switching device of the present invention adjusts the way in which the laser system is monitored. Specifically, when there is an instability, the device decrements the first time interval ($\Delta t$) and increments the second time interval ($\Delta\tau$). This is done each time there have been an n consecutive number of changes in the BER from below the reference rate to above the reference rate within a predetermined time period (T). In this case the total time (T) is determined by the expression: $T=n(\Delta t+\Delta\tau)$. On the other hand, after the laser system has stabilized, the switching device will reset the first time interval ($\Delta t$) and the second time interval ($\Delta\tau$) to their original values. Specifically, this is done whenever there have been less than an n number of changes in the BER from below the reference rate to above the reference rate within the total time period (T).

An additional feature of the present invention is provided which accounts for the possibility that direct sunlight may increase the noise level in a laser beam transceiver. The present invention accounts for this possibility by recognizing that the laser beam (carrier wave) will have a higher d.c. level (noise) that results from the direct sunlight. This d.c. level, unfortunately, can corrupt the optical signal in any of several ways. Nevertheless, regardless of the manner in which the signal is corrupted, the d.c. level can be monitored so that the switching device will change to the microwave system whenever the d.c. level becomes intolerable.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
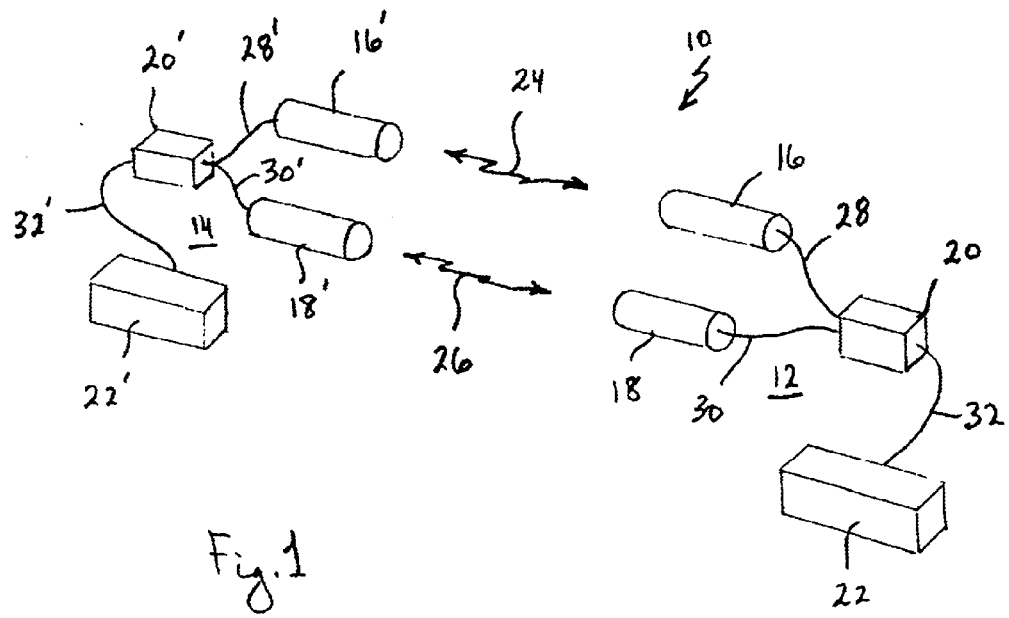
FIG. 1 is a schematic drawing of a line-of-sight communications link through free space between stations employing the switching device of the present invention.

Referring initially to FIG. 1, in accordance with the present invention, a line-of-sight communications link through free space is shown and is generally designated 10. For this link 10, there is a station 12 and a station 14 which are essentially identical to each other. Accordingly, the numerical designations that are given to the various components of station 12 correspond directly to the primed numerical designations shown for the same components used at the station 14.

In FIG. 1, it will be seen that the station 12 includes a first transceiver 16 and a second transceiver 18. Preferably, the first transceiver 16 is of a type well known in the pertinent art which is suitable for transmitting and receiving data that is carried on a laser beam. On the other hand, the second transceiver 18 is preferably of a type, also well known in the pertinent art, which is suitable for transmitting and receiving data that is carried on a microwave beam. Further, it will also be seen that the station 12 includes a switch 20 and a communications console 22.

As intended for the communications link 10 of the present invention, the transceiver 16 of station 12 will communicate with the transceiver 16' of station 14 via a carrier wave 24 (laser beam). Alternatively, the transceiver 18 of station 12 will communicate with the transceiver 18' of station 14 via a carrier wave 26 (microwave beam). Communications within the station 12 are then completed by a connector 28 (e.g. fiber optic or copper cable) which joins the transceiver 16 with the switch 20, and a connector 30 (e.g. fiber optic or copper cable) which joins the transceiver 18 with the switch 20. In turn, the switch 20 is joined by a connector 32 (e.g. fiber optic or copper cable) with the communications console 22.

Figure 2:
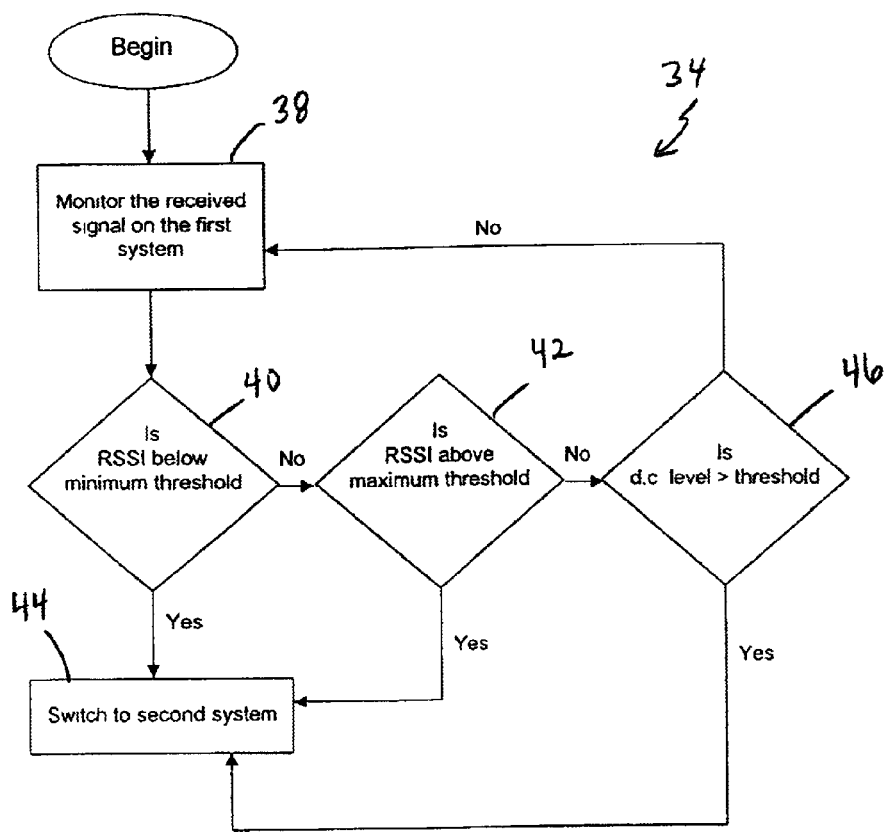
FIG. 2 is a logic flow chart of an operation for monitoring the signal quality of an optical signal in accordance with the present invention.
Figure 3:
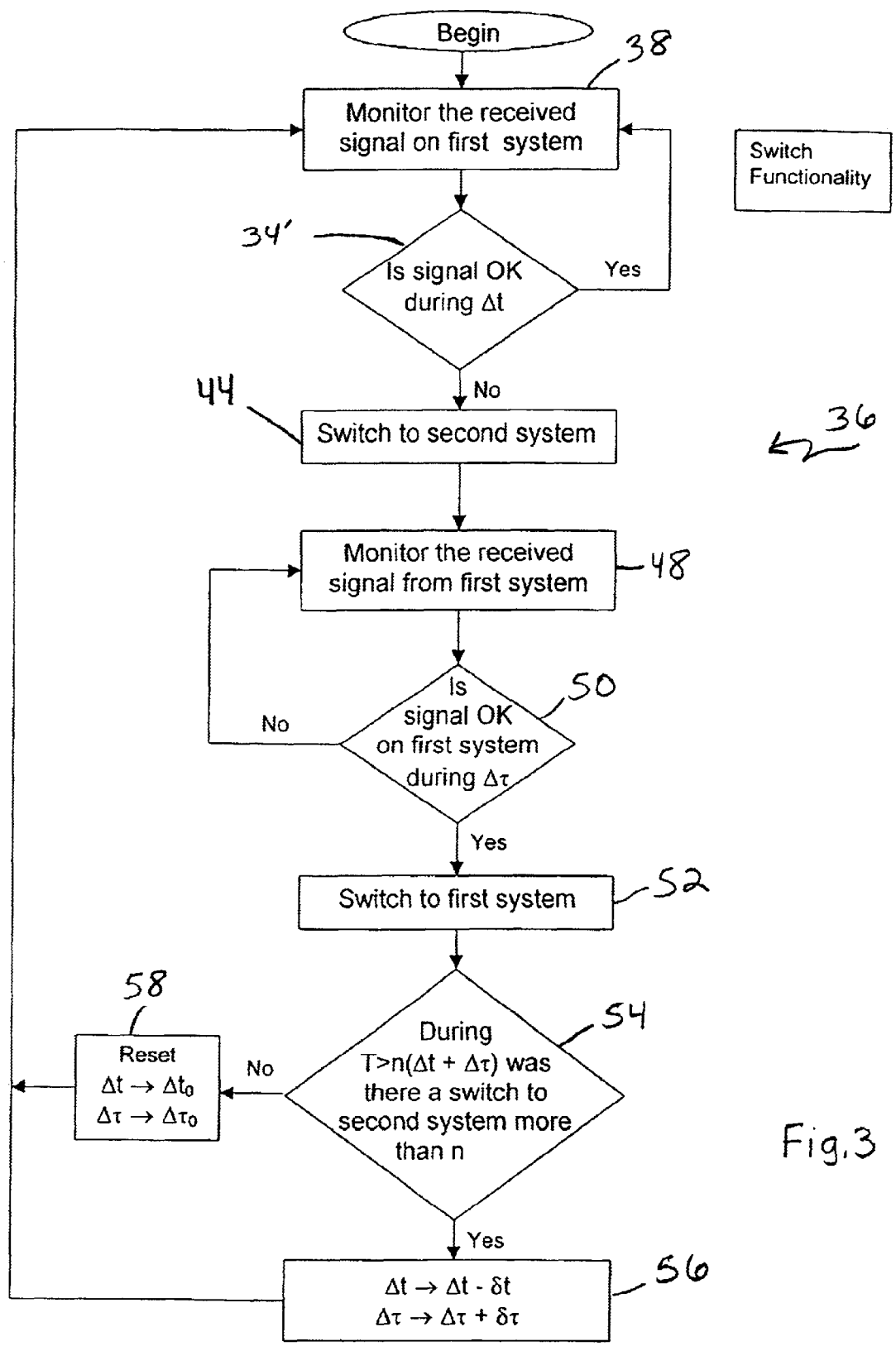
FIG. 3 is a logic flow chart for the operation of the variable timed sequence regimen used by the present invention for switching between a laser communications system and a microwave communications system.

The operation of the communications link 10 relies primarily on the concerted functioning of an optical detector 34 (FIG. 2) and a switching mechanism 36 (FIG. 3). Operationally, the optical detector 34 is incorporated as a subassembly of the transceivers 16/16', while the switching mechanism 36 is mounted within the switches 20/20'. Functionally, the optical detector 34 operates according to the logic flow chart shown in FIG. 2, and the switching mechanism 36 operates according to the logic flow chart shown in FIG. 3. Together, the optical detector 34 and the switching mechanism 36 operate to maximize the data throughput of the link 10 while maintaining an acceptable BER. Specifically, this is done by preferably using the higher data rate transmission capabilities of the transceivers 16/16'. According to the present invention this is basically done in a two-step process. First, the optical detector 34 is used to determine whether the carrier wave 24 is suitable for transmitting and receiving data. Second, the switching mechanism 36 determines the timed sequence in which communications are to be switched between one system (transceivers 16/16') and another system (transceivers 18/18'). The object here, of course is to maximize the effective operation of the transceivers 16/16'.

By referring to the function block 38 in FIG. 2, it is to be appreciated that the optical detector 34 continuously monitors either the carrier wave 24 or, alternatively, a pilot beam (not shown) as they are being respectively received by the transceivers 16/16' (first system). More specifically, the received signal strength intensity (RSSI) of either optical signal that is carried on the carrier wave 24 is determined. Thus, when considered together, the decision blocks 40 and 42 in FIG. 2 then indicate that the RSSI of the optical signal must be within an acceptable range. Specifically, if the RSSI is below a predetermined minimum threshold (block 40), or if it is above a predetermined maximum threshold (block 42), switch 20 will be instructed by the decision block 44 to switch to the transceivers 18/18' (second system).

As a practical consideration, the RSSI is used to calculate the effective bit error rate (BER) for the optical signal (i.e. carrier wave 24 or pilot beam). As is well known by those skilled in the pertinent art, the BER is an effective indicator of the received signal quality. Further, although the RSSI may be within the acceptable range, the effect of noise (e.g. direct sunlight) must also be accounted for. In this case, because the noise has an identifiable d.c. level within the carrier wave 24, this d.c. level is measured. As indicated by the decision block 46, whenever this d.c. level is above a predetermined threshold (e.g. too much sunlight), the decision block 44 will intervene and instruct the switch 20 to change from the transceivers 16/16' to the transceivers 18/18'. As indicated above, this switching from one system to another is accomplished in accordance with a timed logic sequence, and is accomplished with the objective of maximizing the effective use of the transceivers 16/16'. Specifically, this is accomplished by the switching mechanism 36 shown in FIG. 3.

Referring now to FIG. 3, it is to be appreciated that the functional aspects of the optical detector 34 are incorporated into the decision block 34' of the switching mechanism 36. The decision block 34', however, indicates there is a time delay aspect of the optical detector 34. Specifically, as indicated by decision block 34', there is a time interval ($\Delta t$) wherein there is a delay in the switching from the transceivers 16/16' (first system) to the transceivers 18/18'. Typically, the time interval ($\Delta t$) will be of rather short duration (often much less than one second, and more probably only a few milliseconds). Accordingly, it is incorporated to prevent an unnecessary switching between systems when the cause of an interruption of the link 10 is only momentary (e.g. a bird flying between the transceivers 16/16').

Once the operation of the link 10 is switched from the transceivers 16/16' to the transceivers 18/18', the function block 48 indicates that the optical path between the transceivers 16/16' continues to be monitored. Specifically, this is done with the pilot beam that will be transmitted and, hopefully, received by the transceivers 16/16'. In any event, the communication of data is continued by using the transceivers 18/18' until it has been determined that the transceivers 16/16' are operationally functional. Here again there is a delay. As indicated by the decision block 50, and its interaction with the function block 52. There will be a second time interval ($\Delta \tau$) during which the transceivers 16/16' need to be continuously operable before there will be a switch from the transceivers 18/18' (second system) back to the transceivers 16/16' (first system). Typically the second time interval ($\Delta \tau$) will be longer than the first time interval ($\Delta t$) and will be around five seconds in duration. The number of times that the switching mechanism 36 attempts to switch from the second system (transceivers 18/18') back to the first system (transceivers 16/16') will affect subsequent operation of the mechanism 36. In particular, the number of such attempts is counted within a total time period (T), and this total time T is compared with an expression which includes the number of switch attempts, n, and both the first delay ($\Delta t$) and the second delay ($\Delta \tau$). Specifically, as indicated by decision block 54 an inquiry is made during a time period T, wherein : T=n($\Delta t + \Delta \tau$). According to function block 56, when T>n($\Delta t + \Delta \tau$) the first time interval ($\Delta t$) decremented ($\Delta t \rightarrow \Delta t - \delta t$) and the second time interval ($\Delta \tau$) is incremented ($\Delta \tau \rightarrow \Delta \tau + \delta \tau$) whenever there have been an n number of changes in the BER from below the reference rate to above the reference rate within the total time period (T). On the other hand, function block 58 indicates that the original values for $\Delta t$ and $\Delta \tau$ are reset whenever there have been less than n number of changes in the BER from below the reference rate to above the reference rate within the total time period (T). When considering these reconfigurations for $\Delta t$ and $\Delta \tau$ it is important to use the value "n" as the number of unsuccessful attempts that are made to return to the first system while the second system is operating.

Operation

Figure 4:
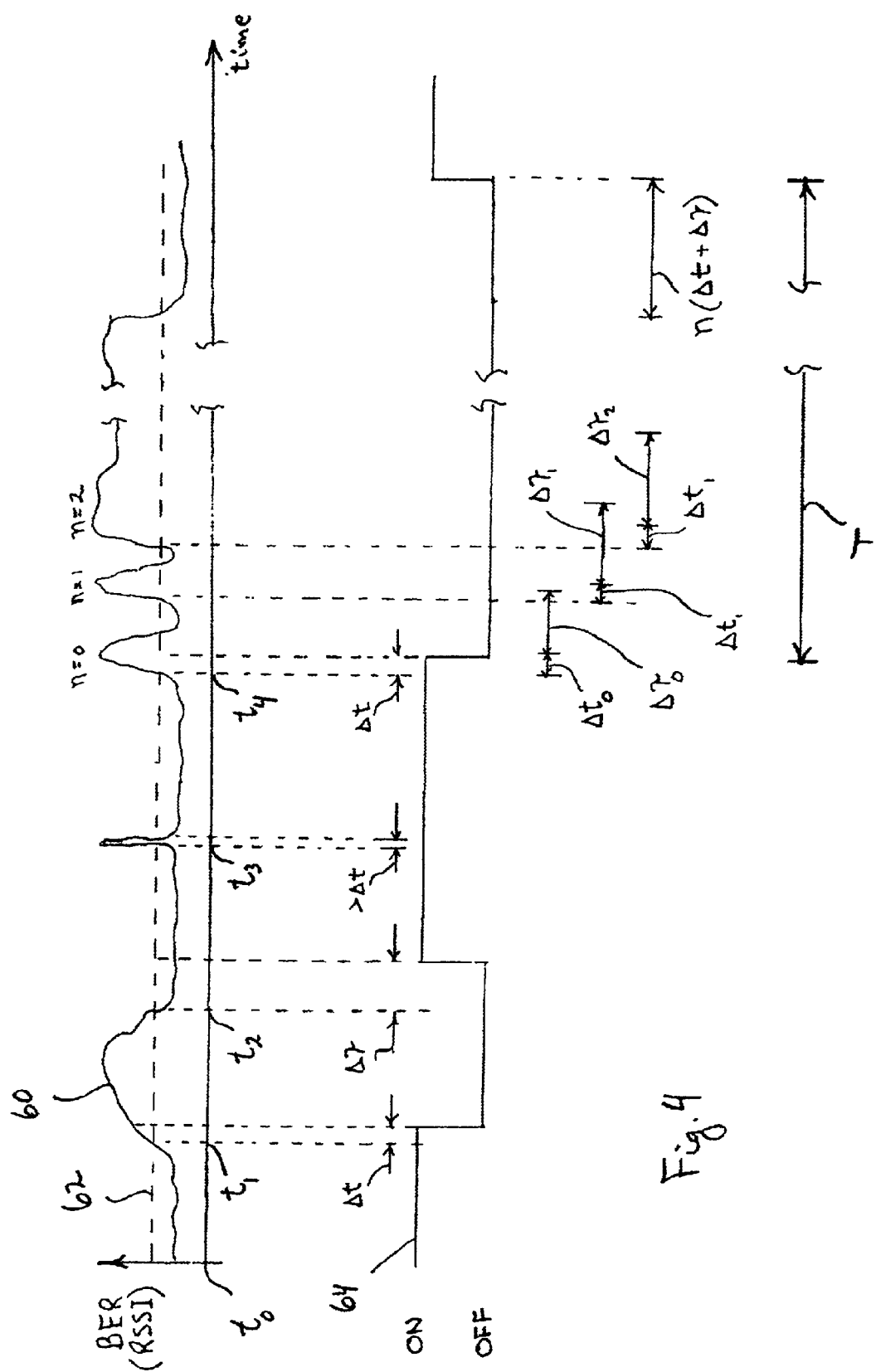
FIG. 4 is a time line of the interrelationship between the BER of the optical signal that is received by a laser transceiver, and the variable timed sequence regimen of the switching device of the present invention, showing various switching scenarios.

For the operation of the link 10, reference is made to FIG. 4. There it will be seen that a simulated time history of the BER 60 is given relative to a reference rate 62. As indicated above, the reference rate 62 is established as a threshold above which operation of the transceivers 16/16' is considered ineffective. Accordingly, the switch line 64 (also shown in FIG. 4) tends to follow fluctuations in the BER 60 and generally corresponds to an ON operation of the transceivers 16/16' (first system) when the BER 60 is below the reference rate 62. On the other hand, an OFF condition is shown for the transceivers 16/16' in response to fluctuations of the BER 60 above the reference rate 62. Further, although the ON-OFF operation shown in FIG. 4 is for the transceivers 16/16' (first system), it is to be appreciated that when the first system is ON, the second system is OFF, and vice versa. As indicted in FIG. 4 the correspondence of these operations to whether the BER 60 is actually above or below the reference rate 62 is not direct.

Consider that at the beginning of the operation of the link 10 (i.e. at time $t_0$), the BER 60 is below the reference rate 62. This indicates acceptable operation of the first system and, accordingly, the switch line 64 indicates that the transceivers 16/16' are ON. At a subsequent time, $t_1$, the BER 60 for some reasons goes above the reference rate 62. Note that switch line 64 does not immediately change from ON to OFF. Instead, there is a time delay $\Delta t$ (see decision block 34', FIG. 3) during which the first system remains operable. However, after $t_1$, if BER 60 remains above the reference rate 62 during the time delay $\Delta t$, switch line 64 indicates a change from ON to OFF. The second system is now operating (function block 44). At time $t_2$, when the BER 60 subsequently goes back below the reference rate 62, there is another delay, $\Delta \tau$, while the second system remains operating. If the BER 60 remains below the reference rate 62 during the delay, $\Delta \tau$, the switch line 64 indicates that the first system will again be ON. The sequence just disclosed is rather typical when an atmospheric condition (e.g. fog or rain) interferes with the operation of the first system (transceivers 16/16'). The present invention, however, also considers other eventualities.

The fluctuation of the BER 60 at time $t_3$ is representative of a situation wherein there is a brief interruption of the first system, such as when a bird has flown through the carrier wave 24. As indicated by switch line 64 (and block 34'), when such an interruption occurs for less that the delay time $\Delta t$, there will be no change from the first system to the second system. A sequence of fluctuations of the BER 60 above and below the reference rate 62 may, however, indicate an unstable situation wherein continued operation on the second system may be preferable.

Consider now the scenario which begins at the time $t_4$. Prior to time $t_4$, the BER 60 has been below the reference rate 62 and the first system has been ON. At time $t_4$, however, the BER 60 goes above the reference rate 62 and remains there beyond $\Delta t$. As indicated above, this requires the link 10 to switch from ON to OFF on switch line 64. Because this is an actual switch to the second system, n=0. Subsequently, although the BER 60 may go briefly below the reference rate 62, if each excursion below the reference rate 62 is for less than the required delay time $\Delta\tau$, the excursion will be counted as an attempt and the number "n" will increase. Importantly, when there are only attempts to switch, the switch line 64 will not change and will continue to indicate OFF. Stated differently, the second system (transceivers 18/18') will continue operation. Depending on the number of attempts "n" that are made during a total time period "T", the first delay $\Delta t$ can be decremented ($\Delta t_1$ for n=1; $\Delta t_2$ for n=2; etc.) and the second delay $\Delta\tau_1$ for n=1; $\Delta\tau_2$ for n=2; etc.)(see block 56, FIG. 3). On the other hand, block 58 indicates that under certain circumstances the delays will be reset to their original values.

In addition to the various scenarios discussed above, it is to be appreciated that for any scenario which may lead to a sudden, dramatic or significant increase in the intensity of the carrier wave 24 must somehow be effectively accounted for. This is most likely to happen after there has been a dramatic drop in the RSSI. Such a situation is of particular concern when the transceivers 16/16' include optical instruments such as telescopes or binoculars (not shown) that may cause damage or injury if there is a sudden burst in intensity of the carrier wave 24. Thus, whenever the RSSI suddenly drops to zero, or near zero (excluding thermal and shot noises of the transceiver 16), it is desirable for the transceivers 16/16' to initiate an automatic power reduction (APR). The transmittal power should then be maintained at the reduced level until the d.c. level of the RSSI goes above zero.

While the particular Optical Communications System With Back-up Link as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for operational switching between line-of-sight optical communications systems which comprises:
   a first transceiver for transmitting and receiving a signal on a first carrier wave;
   a means for determining a bit error rate (BER) for said signal;
   a means for comparing the bit error rate with a reference rate;
   a means for switching to a second transceiver for transmitting and receiving said signal on a second carrier wave when said BER is above the reference rate; and
   a first delay circuit for continuing a transmission of said signal by said first transceiver for a first time interval ($\Delta t$) immediately after said BER goes above said reference rate.

2. A device as recited in claim 1 further comprising a second delay circuit for continuing transmission of said signal by said second transceiver for a second time interval ($\Delta\tau$) immediately after the BER goes below said reference rate.

3. A device as recited in claim 2 further comprising means for decrementing said first time interval ($\Delta t$) and incrementing said second time interval ($\Delta\tau$) whenever there have been an n number of changes in the BER from below said reference rate to above said reference rate within a total time period (T), wherein $T \geq n(\Delta t + \Delta\tau)$.

4. A device as recited in claim 3 further comprising means for resetting original values for said first time interval ($\Delta t$) and said second time interval ($\Delta\tau$) whenever there have been less than n number of changes in the BER from below said reference rate to above said reference rate within a total time period (T) wherein $T \geq n(\Delta t \Delta\tau)$.

5. A device as recited in claim 2 wherein $\Delta t$ is less than approximately one second, and $\Delta\tau$ is approximately five seconds.

6. A device as recited in claim 1 wherein said first carrier wave is a laser light beam and said second carrier wave is a microwave beam.

7. A device as recited in claim 1 wherein said first carrier wave has a received signal strength intensity (RSSI), and the BER is determined by calculations using the RSSI.

8. A device as recited in claim 1 further comprising means for avoiding saturation of said first transceiver by switching from said first transceiver to said second transceiver when a characteristic of said signal has a predetermined value.

9. A device as recited in claim 8 wherein said first carrier wave has a d.c. level and said signal has an a.c. level, and wherein said predetermined value is a ratio of said a.c. level to said d.c. level.

10. A device for operational switching between line-of-sight optical communications systems which comprises:
    a first system for evaluating a signal received by a first transceiver to determine when said signal has a useful received signal strength intensity (RSSI) for said first transceiver and wherein the RSSI is used to calculate a bit error rate (BER) for said signal;
    a second system, responsive to said first system, for switching between said first transceiver and a second transceiver, in accordance with a variable timed sequence regimen, for operation of said second transceiver when said signal does not have a useful RSSI for said first transceiver;
    a means for comparing the bit error rate with a reference rate; and
    a first delay circuit for continuing a transmission of said signal by said first transceiver for a first time interval ($\Delta t$) immediately after said BER goes above said reference rate.

11. A device as recited in claim 10 wherein said first transceiver transmits and receives on a laser beam and said second transceiver transmits and receives on a microwave beam.

12. A device as recited in claim 10 further comprising a second delay circuit for continuing transmission of said signal by said second transceiver for a second time interval ($\Delta\tau$) immediately after said BER goes below said reference rate.

13. A device as recited in claim 12 further comprising:
    a means for decrementing said first time interval ($\Delta t$) and incrementing said second time interval ($\Delta\tau$) whenever there have been an n number of changes in said BER from below said reference rate to above said reference rate within a total time period (T) wherein $T \geq n(\Delta t + \Delta\tau)$; and
    a means for resetting original values for said first time interval ($\Delta t$) and said second time interval ($\Delta\tau$) whenever there have been less than n number of changes in said BER from below said reference rate to above said reference rate within said total time period (T).

14. A device as recited in claim 10 further comprising means for avoiding saturation of said first transceiver by switching from said first transceiver to said second transceiver when a characteristic of said signal has a predetermined value.

15. A device as recited in claim 14 wherein said first carrier wave has a d.c. level and said signal has an a.c. level, and wherein said predetermined value is a ratio of said a.c. level to said d.c. level.

16. A method for operationally switching between line-of-sight optical communications transceivers which comprises the steps of:

determining a bit error rate (BER) for a signal received by a first transceiver;

comparing the BER with a reference rate;

switching to a second transceiver in accordance with a variable timed sequence regimen, for transmitting and receiving said signal when said BER is above the reference rate; and delaying said switching step for a first time interval ($\Delta t$) immediately after said BER goes above said reference rate.

17. A method as recited in claim 16 wherein said variable timed sequence regimen is accomplished by the steps of:

continuing transmission of said signal by said second transceiver for a second time interval ($\Delta \tau$) immediately after said BER goes below said reference rate;

decrementing said first time interval ($\Delta t$) and incrementing said second time interval ($\Delta \tau$) whenever there have been an n number of changes in said BER from below said reference rate to above said reference rate within a total time period (T) wherein $T \geq n(\Delta t + \Delta \tau)$; and resetting original values for said first time interval ($\Delta t$) and said second time interval ($\Delta \tau$) whenever there have been less than n+1 number of changes in said BER from below said reference rate to above said reference rate within said total time period (T).

18. A method as recited in claim 17 wherein said signal has a received signal strength intensity (RSSI), and said BER is determined by calculations using the RSSI.

19. A method as recited in claim 16 further comprising the step of avoiding saturation of said first transceiver by switching from said first transceiver to said second transceiver when a d.c. level in said signal has a predetermined value.

* * * * *

UNITED STATES PATENT AND TRADEMARK OFFICE
CERTIFICATE OF CORRECTION

PATENT NO.    : 6,928,248 B2
DATED         : August 9, 2005
INVENTOR(S)   : Achour et al.

It is certified that error appears in the above-identified patent and that said Letters Patent is hereby corrected as shown below:

<u>Column 8,</u>
Line 12, delete "T≥nΔtΔτ" insert -- T≥n(Δt + Δτ) --.

Signed and Sealed this

Twenty-fifth Day of October, 2005

JON W. DUDAS
*Director of the United States Patent and Trademark Office*